Aug. 17, 1965  H. A. DE CENZO  3,201,147
BREAKAWAY COUPLING
Filed April 21, 1961  2 Sheets-Sheet 2

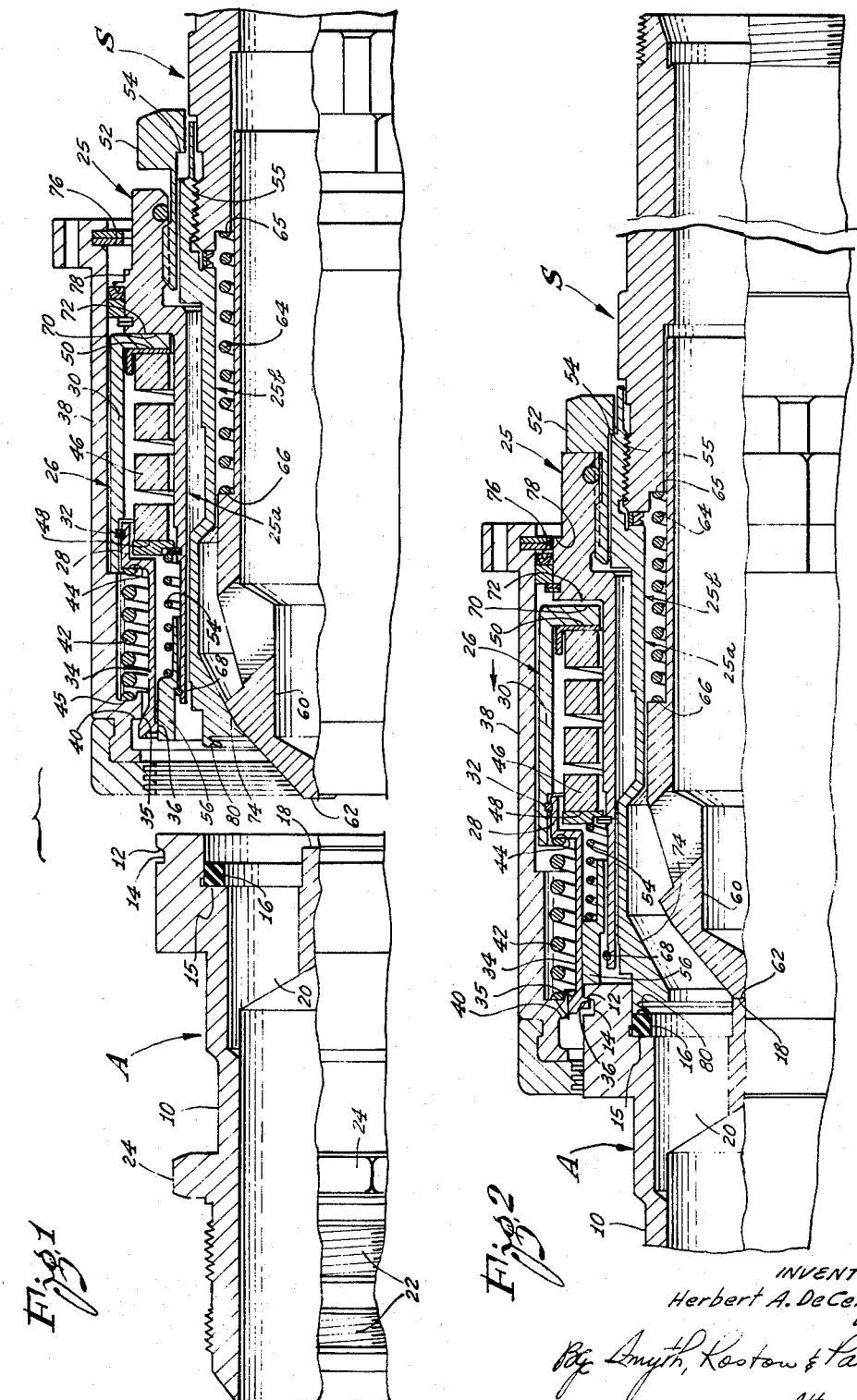

INVENTOR:
Herbert A. DeCenzo
By Smyth, Roston & Pavitt
Attorneys

3,201,147
BREAKAWAY COUPLING
Herbert A. De Cenzo, Arcadia, Calif., assignor to Purolator Products, Inc., a corporation of Delaware
Filed Apr. 21, 1961, Ser. No. 104,690
11 Claims. (Cl. 285—1)

This invention relates to a quick-disconnect coupling assembly to be used for such purposes as releasably interconnecting two passage members for flow therethrough or for interconnecting conductor means of an electric circuit, for example, for releasably connecting an electric cable to a device. The invention is specifically directed to a problem that arises in certain emergencies.

In a conventional quick-disconnect coupling for connecting a hose or an electric cable to a missile, for example, two cooperating coupling bodies are adapted for releasable interconnection. For this purpose, one coupling body is formed with a rearwardly facing engagement shoulder, the second coupling body is equipped with engagement means for radial expansion or contraction into engagement with the engagement shoulder of the first coupling body and the second coupling body is further provided with what may be termed an actuating sleeve that is axially movable to actuate and lock the engagement means. A suitable spring on the second coupling body urges the actuating sleeve towards its locking position at which it is in telescoping relation with the engagement means to hold the engagement means in its engaged position in a positive manner. The two coupling bodies are disconnected simply by retraction of the locking means from its locking position either by direct manual force or by remote control.

Emergencies occur when the connection should be broken and when for some reason the locking sleeve cannot be retracted in the usual manner. For example, the environment of the locking sleeve may become hazardous for manual operations or there may not be time to reach and manipulate the locking sleeve, or a remote control for the locking sleeve may fail. It is desirable therefore, that in an emergency the cooperating coupling bodies be releasable by direct pull on the hose or cable. Such a breakaway coupling is disclosed, for example, in the Smisko Patent Re. 23,925.

In the Smisko coupling the engagement means is yieldingly mounted on the second coupling body instead of being fixedly mounted. The yielding mounting permits the second coupling body to be pulled axially relative to the engagement means and the second coupling body is interlocked with the actuating sleeve to pull the actuating sleeve to its release position. In the Smisko coupling the spring that urges the actuating sleeve towards its effective or locking position also serves to yieldingly hold the engagement means at its normal position on the second coupling body.

It has been found that the design of a coupling assembly in the manner taught by the Smisko patent poses a dilemma. On the one hand, the spring force that urges the actuating sleeve to its locking position must be relatively low to permit the actuating sleeve to be retracted manually; on the other hand, since the engagement means is yieldingly mounted on the second coupling body the sealing pressure between the abutting surfaces of the two coupling bodies is limited to the force exerted by the spring. If the coupling is to handle high pressure fluid, correspondingly high spring pressure is required for an effective seal between the two coupling bodies.

In addition to the problem created by this dilemma, a second problem is involved because if a heavy spring is employed to create the sealing pressure, the heavy spring opposes the final movement of the two coupling bodies into mutual engagement and this final movement must be accomplished by manual force. The present invention solves both of these problems.

The conflict between the requirement for relatively light spring pressure on the actuating sleeve and relatively heavy spring pressure to hold the engagement means in its normal position on the second coupling body is solved by an arrangement which permits the use of two separate springs. A light spring is employed for the actuating sleeve and a heavy spring is employed to hold the engagement means at its normal position on the coupling body.

The second problem is met by a coupling construction which permits the heavy spring to be additionally stressed after the two coupling bodies are mutually engaged. This arrangement permits the heavy spring to present only moderate resistance to the final movement of the coupling bodies into mutual engagement. After the two coupling bodies are engaged the heavy spring is additionally stressed by screw means to provide the required sealing pressure.

A feature of the invention is that the use of a heavy spring with provision for additional stressing of the spring to create sealing action has the unexpected advantage of providing separation force between the two coupling bodies when the two coupling bodies are disconnected. The separation force is stored in the spring by the final stressing of the spring that produces the additional sealing pressure between the two coupling bodies.

The features and advantages of the invention may be understood from the following detailed description and the accompanying drawings.

In the drawings, which are to be regarded as merely illustrative:

FIG. 1 is a fragmentary longitudinal sectional view of the coupling assembly showing the two coupling bodies disconnected and separated from each other;

FIG. 2 is a similar view showing the two coupling bodies in mutual engagement and further showing the heavy spring additionally stressed to create sealing pressure between the two coupling bodies.

Figure 3:
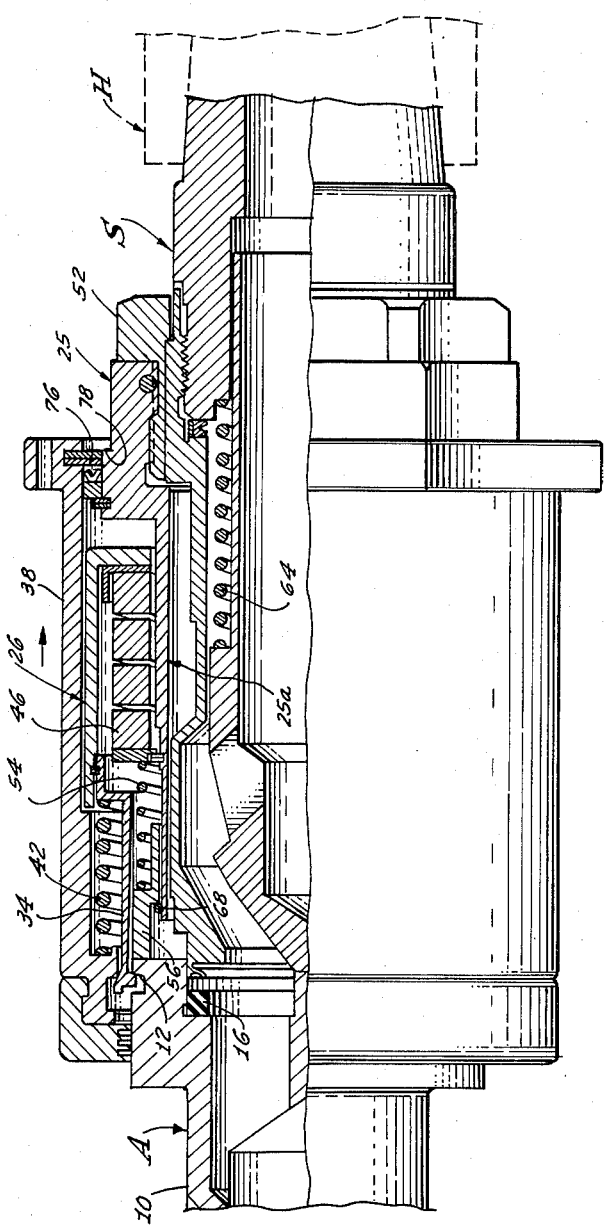
FIG. 3 is a similar view showing the manner in which the two coupling bodies may be quickly disconnected by a strong axial force acting between the two bodies.

In the selected embodiment of the invention shown in the drawings, the two cooperating coupling bodies of the coupling assembly comprise an adapter fitting, generally designated by the letter A, which, for example, may be mounted on a missile, and a socket fitting, generally designated by the letter S, which may be mounted on the end of a flexible hose. Such a flexible hose is indicated in phantom in FIG. 3 and is generally designated by the letter H. FIG. 1 shows the socket S close to the adapter A in position for axial movement into locking engagement with the adapter.

The adapter A comprises a first coupling body 10 formed with an outer circumferential rearwardly facing locking or engagement shoulder 12. For this purpose the first coupling body 10 may be formed with an outer circumferential groove 14. In the construction shown the first coupling body 10 has an inner circumferential shoulder 15 with a suitable sealing ring 16, for example, a sealing ring made of rubber-like material, seated against the shoulder. When the two coupling bodies are interconnected, a rim portion of the socket fitting abuts the sealing ring 16 in pressure contact therewith.

The first coupling body 10 is further formed with an axial nose 18 of reduced diameter which is integral with the outer circumferential wall of the coupling body. The axial nose 18 is connected to the outer circumferential portion of the coupling body by radial webs 20 which form fluid passages around the nose. The outer circumferential wall of the first coupling body is further provided with external mounting threads 22 and is formed with a hexagonal radial flange 24 for receiving a suitable wrench.

The principal parts of the socket S include the following: a second coupling body, generally designated by the numeral 25 comprising two body sections that are slideable longitudinally relative to each other, namely, an outer cylindrical body section 25a and an inner cylindrical body section 25b; an engagement means, generally designated by the numeral 26, for radial contraction into engagement with the engagement shoulder 12 of the first coupling body, the engagement means comprising a forward collet sleeve 28 and a rearward sleeve 30 interconnected by a snap ring 32; a circumferential series of flexible collet fingers 34 that are formed by the collet sleeve 28, each collet finger having an outer camming shoulder 35 and an inner locking shoulder 36 for engagement with the locking or engaging shoulder 12 of the first coupling body, the collet fingers being biased radially outward to their release positions; an axially movable actuating sleeve 38 formed with an inner circumferential shoulder 40 which normally abuts the camming shoulder 35 of the collet fingers 34 as shown in FIG. 1, the camming shoulder then serving as a stop shoulder; a first yielding means in the form of a coil spring 42 in compression between a forwardly facing shoulder or spring seat 44 of the engagement means 26 and a rearwardly facing shoulder or spring seat 45 of the locking sleeve 38 to urge the locking sleeve towards its forward locking position shown in FIG. 2; a second yielding means in the form of a second heavier coil spring 46 acting between a rearwardly facing shoulder or spring seat 48 of the outer cylindrical body section 25a and a forwardly facing shoulder or spring seat 50 of the engagement means 26 to yieldingly maintain the engagement means at its normal position longitudinally of the second coupling body; a nut 52 in screw-threaded engagement with the outer cylindrical coupling body section 25a and formed with an inner circumferential shoulder 54 for abutment against an outer circumferential shoulder 55 of the inner coupling body section 25b to shift the two coupling body sections 25a and 25b longitudinally relative to each other thereby to stress the heavy coil spring 46 after the two coupling bodies are engaged thereby to apply corresponding sealing pressure against the sealing ring 16; a stay-back sleeve 56 that is normally at a forward position inside the circumferential series of collet fingers 34 to prevent inward flexure of the collet fingers out of their release positions, as shown in FIG. 1 thereby to cause the collet fingers to hold back the actuating sleeve 38; a coil spring 68 which urges the stay-back sleeve 56 towards its normal forward position; a poppet valve 60 which is normally in the closed position shown in FIG. 4 and which is formed with an axial hose 62 for abutment with the previously mentioned axial nose 18 of the first coupling body 10; and a coil spring 64 which is in compression against a forwardly facing shoulder 65 of the inner coupling body section 25b and a rearwardly facing shoulder 66 of the poppet valve 60 to urge the poppet valve towards its normal forward closed position.

Operation

It is apparent that in this particular embodiment of the invention all of the moving parts are incorporated in the construction of the socket fitting S. When the two coupling bodies are separated the various parts are in the positions shown in FIG. 1.

The actuating sleeve 38 is urged forward by the associated coil spring 42 but is somewhat retracted from its forward limit position because the outer camming shoulders 35 of the collet fingers 34 serve as stops in abutment with the inner circumferential shoulder 40 of the actuating sleeve. The collet fingers 34 cannot flex radially inwardly to release the actuating sleeve 38 because the stay-back sleeve 56 is telescoped inside the collet fingers at its forward limit position. At this forward limit position the stay-back sleeve abuts a snap ring 68 on the outer circumferential body section 25a and is urged against the snap ring by the associated spring 54.

The heavy spring 46 acting in compression between the outer coupling body section 25a and the engagement means 26 yieldingly holds the engagement means at its normal position at which a rearwardly facing shoulder 70 of the engagement means backs against a forwardly facing shoulder 72 of the outer cylindrical body section 25a. The nut 52 is loosened in its screw threaded engagement to give the outer cylindrical body section 25a a range of freedom for longitudinal sliding movement relative to the inner cylindrical body section 25b. A suitable stop element 73 limits the unscrewing of the nut 52. The valve spring 64 holds the poppet valve 60 in its closed position against a tapered inner circumferential valve seat 74 formed by the inner cylindrical body section 25b.

When the two coupling bodies are moved into the mutual telescoping relation shown in FIG. 2, the first coupling body 10 abuts the stay-back sleeve 56 to retract the stay-back sleeve and the collet fingers 34 slide from the outer circumference of the stay-back sleeve onto the outer circumference of the first coupling body 10, the outside diameter of the first coupling body being the same as the outside diameter of the stay-back sleeve. With continued telescoping movement of the two coupling bodies, the inner locking shoulders 36 of the collet fingers 34 reach the outer circumferential engagement shoulder 12 of the first coupling body 10. The forward pressure of the actuating sleeve 38 against the outer camming shoulders 35 of the collet fingers derived from the pressure of the spring 42 causes the actuating sleeve to advance and cam the collet fingers 34 into engagement with the outer circumferential engagement shoulder 12. The actuating sleeve then advances to the locking position shown in FIG. 2 to confine and lock the collet fingers in their radially inward positions in engagement with the outer circumferential engagement shoulder 12. The forward movement of the actuating sleeve 38 to its locking position by the spring 42 is limited by abutment of an inner circumferential stop shoulder 76 (FIG. 1) of the actuating sleeve 38 against an outer circumferential stop shoulder 78 of the outer cylindrical body section 25a.

In the meantime the nose of the poppet valve 60 encounters the axial nose 18 of the first coupling body 10 and is thereby retracted to open position in opposition to the spring 64. As may be seen in FIG. 2, there is a clear fluid channel through the two coupling bodies when the poppet valve is retracted in this manner.

When the two coupling bodies close together the leading rim portion 80 of the inner cylindrical coupling body section 25b moves into contact with the sealing ring 16 inside the first coupling body 10. Since the heavy coil spring 46 is intended to be normally confined under a relatively high pressure, say a pressure of 500 pounds, that is too great to be overcome manually, it is contemplated that the two coupling bodies will be normally moved into interlocking engagement with each other without placing the heavy spring under compressive stress. The fact that the heavy spring 46 acts against the outer cylindrical body section 25a and the outer body section 25a is slidable longitudinally relative to the inner body seciton 25b and the further fact that it is the inner body section 25b that abuts the first coupling body 10, make it possible to interlock the two coupling bodies without interference by the highly compressed spring 46.

After the two coupling bodies are interlocked, however, the nut 52 which screw threadedly engages the outer coupling body 25a is manually rotated to cause the inner circumferential shoulder 54 of the nut to abut the outer circumferential shoulder 55 of the inner cylindrical body section 25b. The tightening of the nut is continued to draw the inner cylindrical body section 25b forward relative to the inner circumferential body section 25a. This action slightly contracts the heavy spring 46 and transmits pressure from the heavy spring to the inner cylindrical body section 25b and thereby transmits sealing pressure to the sealing ring 16. This action may be regarded as a rearward shift of the rearwardly facing spring-engaging shoulder 48 relative to the second coupling body 25 or may be regarded as a forward extension of the leading rim 80 of the second coupling body relative to the rearwardly facing spring-engaging shoulder 48.

It is to be noted that the nut 52 by virtue of the screw thread action serves as a force-multiplying means which may be manually manipulated by a suitable wrench to overcome the high pressure of the heavy spring 46. The nut is tightened to provide whatever pressure against the ring 16 is required for sealing action against the confined pressurized fluid.

The normal procedure for disconnecting the two coupling bodies is simply to retract the actuating sleeve 38 against the opposition of the spring 42. A lanyard (not shown) may be attached to the actuating sleeve for retraction thereof, the actuating sleeve having a radial projection with a bore 82 for that purpose. As heretofore stated, the collet fingers 34 are biased radially outward to seek release positions and retraction of the actuating sleeve 38 permits the collet fingers to flex outward to the release positions shown in FIG. 1. As relative separation movement occurs between the two coupling bodies, the stay-back sleeve 56 advances under the pressure of the spring 54 to slide under the collet fingers and to keep the collet fingers in their outwardly flexed release positions. When the actuating sleeve 38 is released to return to its forward position it is moved forward by the spring 42 to bring the inner circumferential shoulder 40 of the actuating sleeve into abutment with the outer camming shoulders 35 of the outwardly flexed collet fingers. In the meantime the valve spring 64 closes the poppet valve 60.

As in conventional couplings of this general type the pressure of the spring 54 against the retracted stay-back sleeve 56 causes the stay-back sleeve to exert separating force against the first coupling body 10. This separation force is, however, a relatively weak force. An advantage of the present invention is that when the heavy spring 46 is stressed by tightening of the nut 52 to create sealing pressure, it stores a separation force of a useful magnitude in the heavy spring 46. When the collet fingers 34 are disengaged from the outer circumferential engagement shoulder 12 of the first coupling body 10 this separation force is released to kick the two coupling bodies apart.

In the event of an emergency in which it becomes necessary to disengage the two coupling bodies without taking the usual step of manually retracting the actuating sleeve 38, sufficient force may be applied to pull on the hose H and cause the second coupling body 25 to be retracted relative to the engagement means 26 with consequent axial compression of the heavy spring 46. Since the stop shoulder 76 of the actuating sleeve 38 is in engagement with the stop shoulder 78 of the outer cylindrical body section 25a, the rearward retraction of the second coupling body 25 against the opposition of the heavy spring 46 causes corresponding rearward retraction of the actuating sleeve. When the actuating sleeve 38 is retracted in this manner to the extent shown in FIG. 3 the collet fingers 34 are free to flex outward out of engagement with the outer circumferential engagement shoulder 12 of the first coupling body 10.

It will be readily appreciated that if the connector is used to connect a hose to a missile, no damage will result from failure to disconnect the hose prior to the launching of the missile. The launching of the missile will place the hose under sufficient tension to cause automatic disengagement of the socket fitting on the end of the hose from the adapter fitting on the missile.

My description in specific detail of the selected embodiment of the invention will suggest various changes, substitutions and other departures from my disclosure within the spirit and scope of the appended claims. For example it is well known that a yielding means may be in the form of pneumatic means or hydraulic means as well as in the form of a mechanical spring.

I claim:

1. In a coupling assembly of the character described wherein a first coupling body has a rearwardly facing engagement shoulder and a cooperating second coupling body has engagement means radially movable to engage said shoulder to interconnect the two bodies and further has actuating means to lock said engagement means in its engaged position, said actuating means being retractable relative to the second coupling body rearwardly thereof against the force of a yielding means to release the engagement means, the improvement comprising: said second coupling body having a normal forward position relative to the engagement means and being movable rearwardly relative to said engagement means from said normal position when said engagement shoulder and said engagement means are locked in engaged position by said actuating means; a second yielding means exerting force between the second coupling body and the engagement means to normally hold the second coupling body at its normal forward position relative to the engagement means; and said actuating means having a portion for engagement by the second body to permit rearward movement of the actuating means therewith to unlock the engagement means, whereby the two coupling bodies may be released from each other either by retraction of the actuating means alone against the resistance of the first-mentioned yielding means or by retraction of the second coupling body together with the actuating means against the resistance of the second yielding means.

2. A combination as set forth in claim 1 in which said second yielding means is stronger than the first yielding means.

3. A combination as set forth in claim 1 in which both of said yielding means are springs.

4. A combination as set forth in claim 1 which further includes means to apply the force of said second yielding means to create sealing abutment of the second coupling body against the first coupling body after the two coupling bodies are locked together by said engagement means.

5. A combination as set forth in claim 1 in which:
said second yielding means acts between the engagement means and the second body at a point on the second body;
and which includes means to shift said point on the second coupling body longitudinally thereof to stress said second yielding means and thereby create sealing pressure of the second coupling body against the first coupling body.

6. A combination as set forth in claim 5 in which said shifting means is a force multiplying means.

7. In a coupling assembly of the character described, the combination of: a first coupling body having a rearwardly facing engagement shoulder; a second coupling body for sealing abutment against the first coupling body, said second coupling body having a rearwardly facing shoulder; radially expansible and contractible engagement means on said second coupling body to engage said engagement shoulder to interconnect the two bodies, said engagement means being movable forwardly of the second coupling body from a normal rearward position thereon, said engagement means having a first forwardly facing shoulder and a second forwardly facing shoulder spaced rearwardly therefrom; actuating means having a forward rearwardly facing shoulder, said actuating means being mounted on said second coupling body for movement relative thereto between a rearward release position and a forward position locking said engagement means in its engaged position, a stop portion of said actuating means engaging a portion of said second coupling body to limit the forward movement of the actuating means relative to the second coupling body; a first yielding means acting between said first shoulder of the engagement means and said forward rearwardly facing shoulder of the actuating means to urge the actuating means towards its forward locking position; and a second stronger yielding means acting between said second shoulder of the engagement means and said rearwardly facing shoulder of the second coupling body to normally hold the engagement means at a rearward position relative to the second coupling body, whereby the two coupling bodies may be disconnected either by retracting said actuating means along against the resistance of said first yielding means or by retracting the second body relative to said engagement means against the resistance of said second yielding means to cause the second body to retract the actuating means by engagement with said stop portion thereof.

8. A combination as set forth in claim 7 in which said rearwardly facing shoulder of the second coupling body is movable longitudinally of the second coupling body to stress said second yielding means for increasing the pressure of the sealing abutment of the second coupling body against the first coupling body.

9. A combination as set forth in claim 7 which includes manually operable force-multiplying means to shift said rearwardly facing shoulder of the second coupling body to stress said second yielding means for increasing the pressure of the sealing abutment of the second coupling body against the first coupling body.

10. A combination as set forth in claim 7 in which said second coupling body has two sections shiftable longitudinally relative to each other with said rearwardly facing shoulder of the second coupling body on one of said two sections whereby after the two coupling bodies are connected together the two sections may be shifted relative to each other to stress said second yielding means for increasing the pressure of the sealing abutment of the second coupling body against the first coupling body.

11. A combination as set forth in claim 10 which includes manually rotatable means in telescoping threaded engagement with one of said two sections and in engagement with a portion of the other of the two sections to shift the two sections relative to each other.

References Cited by the Examiner
UNITED STATES PATENTS

| | | | |
|---|---|---|---|
| 491,299 | 2/93 | Vogt | 285—312 |
| 1,138,946 | 5/15 | Elliott | 285—357 |
| 1,154,984 | 9/15 | Forth | 285—312 |
| 2,423,239 | 7/47 | Housekeeper | 285—309 |
| 2,485,763 | 10/49 | Moon | 285—313 |
| 2,699,961 | 1/55 | Omon | 285—1 |
| 2,797,110 | 6/57 | Covington | 285—277 |
| 2,860,893 | 11/58 | Clark | 285—1 |
| 2,951,713 | 9/60 | Hoffstrom | 285—317 |

THOMAS F. CALLAGHAN, *Primary Examiner.*